US012181573B2

(12) United States Patent
Ray

(10) Patent No.: US 12,181,573 B2
(45) Date of Patent: Dec. 31, 2024

(54) RADAR PROCESSING METHOD AND SYSTEM

(71) Applicant: The Boeing Company, Chicago, IL (US)

(72) Inventor: Gary A. Ray, Issaquah, WA (US)

(73) Assignee: The Boeing Company, Arlington, VA (US)

( * ) Notice: Subject to any disclaimer, the term of this patent is extended or adjusted under 35 U.S.C. 154(b) by 429 days.

(21) Appl. No.: 17/570,208

(22) Filed: Jan. 6, 2022

(65) Prior Publication Data

US 2023/0213648 A1    Jul. 6, 2023

(51) Int. Cl.
*G01S 13/90*        (2006.01)

(52) U.S. Cl.
CPC ...... *G01S 13/9029* (2013.01); *G01S 13/9027* (2019.05)

(58) Field of Classification Search
CPC .............. G01S 13/904; G01S 13/9011; G01S 13/9029; G01S 13/9017; G01S 15/8997; G01S 13/90; G01S 13/89; G01S 13/9043; G01S 13/9052; G01S 13/9089; G01S 13/9076; G01S 13/9056
USPC ....................................................... 342/25 R
See application file for complete search history.

(56) References Cited

U.S. PATENT DOCUMENTS

| | | | | |
|---|---|---|---|---|
| 6,222,933 B1* | 4/2001 | Mittermayer | ......... | G01S 13/904 382/293 |
| 6,518,914 B1* | 2/2003 | Peterson | ............. | G01S 13/5244 342/25 R |
| 2015/0234043 A1* | 8/2015 | Jin | .......................... | G01S 13/90 342/25 A |
| 2017/0016987 A1* | 1/2017 | Gierull | .................... | G01S 7/414 |
| 2020/0103520 A1* | 4/2020 | Fox | ......................... | G01S 13/90 |
| 2022/0026564 A1* | 1/2022 | Kim | ......................... | G06T 5/10 |

FOREIGN PATENT DOCUMENTS

CN    102565772 B  *  7/2013

OTHER PUBLICATIONS

G. Krieger et al., "Spaceborne bi- and multistatic SAR: potential and challenges", IEE Proc.—Radar Sonar Navig., vol. 153, No. 3, Jun. 2006.

(Continued)

*Primary Examiner* — Olumide Ajibade Akonai
(74) *Attorney, Agent, or Firm* — Alleman Hall & Tuttle LLP

(57) ABSTRACT

A computer-implemented method for processing radar information comprises receiving synthetic aperture radar (SAR) data that specifics a sequence of radar acquisitions of a target area taken over a particular acquisition time. The method comprises forming a plurality of sub-aperture images, wherein each sub-aperture image is associated with radar acquisitions of the target area taken over a particular interval of the acquisition time. The method further comprises determining, based on the plurality of sub-aperture images, velocities associated with one or more target objects moving within the target area; and generating an image associated with the SAR data that depicts the one or more target objects and the velocities associated with one or more target objects.

20 Claims, 8 Drawing Sheets

(56) References Cited

OTHER PUBLICATIONS

Govani, Mark A et al., "Analysis of Polarization Mismatch Loss of Horizontal Linear Feature Detection", US Army CERDEC 12WD Report, OMB No. 0704-0188, Jun. 12, 2012.
Raynal, Ann Marie et al., "Initial Assessment of an Airborne Ku-band Polarimetric SAR", Sandia Report, SAND2013-1636, Printed Feb. 2013.
Stojanovic, Ivana et al., "Imaging of moving targets with multi-static SAR using an overcomplete dictionary", IEEE Journal on Selected Topics in Signal Processing, Apr. 5, 2009. https://arxiv.org/abs/0904.0821v1.
Borceay, Liliana et al., "Synthetic Aperture Radar Imaging and Motion Estimation via Robust Principal Component Analysis", SIAM Journal on Imaging Sciences 6(3), Aug. 22, 2012.
Yasin, Mubashar, "SAR Imaging of Moving Targets by Subaperture Based Low-Rank and Sparse Decomposition", Master of Science Thesis, Sabanci University, Aug. 2017, http://people.sabanciuniv.edu/mcetin/publications/Yasin MS 2017.pdf.
Bezvesilniy, O., et al. "Autofocus: the Key To a High SAR Resolution", 2012 International Conference on Mathematical Methods in Electromagnetic Theory, 2012 IEEE.
Morrison, Robert L. et al., SAR Image Autofocus By Sharpness Optimization: A Theoretical Study. IEEE.
Hilaura Raquel Nava Valles, "Modeling and Simulation of Point Spread Functions for Advanced SAR Systems", Master of Science thesis, University of Puerto Rico, 2004.

\* cited by examiner

RADAR PROCESSING METHOD AND SYSTEM

BACKGROUND

Field

This application generally relates to radar systems. In particular, this application describes examples of methods and systems that facilitate synthetic aperture radar processing.

Description of Related Art

Synthetic aperture radar (SAR) is used extensively in satellite and airborne imaging for many different applications, such as providing a 2D reflectivity map of a target area. Here, targets with high back-scattered signals show as bright spots in the radar images and flat smooth surfaces as dark areas. SAR data collection can be done monostatically (same location for transmitter and receiver) or bistatically (where the transmitter and receiver are spatially separated, typically transmit and receive antennas are on different platforms). In addition, radar can be dual or quad polarimetric (HH, HV, VH, VV where His horizontal and Vis vertical polarization). These provide another imaging dimension like color provides for visible sensing. For example, polarization is often used to create a false color image to enhance the original grayscale SAR image.

In the airborne case, the direction of the electric field vector for horizontal polarization is parallel to the earth's surface, and the vertical polarization is perpendicular to the surface. The same type of polarization transmission and reception is referred to as VV or HH (first letter of the pair is the transmitter, second is the receiver). The cross-polarization response is the transmission and reception of opposite orientations of the electric field (HV or VH). These additional methods enhance both clutter and man-made object detection. For example, polarimetric radar has been applied to power line detection where VV and HV returns are higher than HH at aspect angles away from normal incidence and for steeper grazing angles. VV and HV returns are also highly correlated and their product with averaging can increase the signal to clutter ratio versus VV alone. These distinguishing characteristics can more generally be applied to linear and axially symmetric features as man-made vehicles and objects would have.

SUMMARY

In a first aspect, a computer-implemented method for processing radar information comprises receiving synthetic aperture radar (SAR) data that specifics a sequence of radar acquisitions of a target area taken over a particular acquisition time. The method comprises forming a plurality of sub-aperture images, wherein each sub-aperture image is associated with radar acquisitions of the target area taken over a particular interval of the acquisition time. The method further comprises determining, based on the plurality of sub-aperture images, velocities associated with one or more target objects moving within the target area; and generating an image associated with the SAR data that depicts the one or more target objects and the velocities associated with one or more target objects.

In a second aspect, a computing system that facilitates processing radar information includes a memory and a processor and the memory stores instruction code. The processor is in communication with the memory. The instruction code is executable by the processor to cause the computing system to perform operations that comprise receiving synthetic aperture radar (SAR) data that specifics a sequence of radar acquisitions of a target area taken over a particular acquisition time. The operations comprise forming a plurality of sub-aperture images, wherein each sub-aperture image is associated with radar acquisitions of the target area taken over a particular interval of the acquisition time. The operations further comprise determining, based on the plurality of sub-aperture images, velocities associated with one or more target objects moving within the target area; and generating an image associated with the SAR data that depicts the one or more target objects and the velocities associated with one or more target objects.

In a third aspect, a non-transitory computer-readable medium having stored thereon instruction code that facilitates processing radar information is provided. When the instruction code is executed by a processor of a computing system, the computing system performs operations that comprise receiving synthetic aperture radar (SAR) data that specifics a sequence of radar acquisitions of a target area taken over a particular acquisition time. The operations comprise forming a plurality of sub-aperture images, wherein each sub-aperture image is associated with radar acquisitions of the target area taken over a particular interval of the acquisition time. The operations further comprise determining, based on the plurality of sub-aperture images, velocities associated with one or more target objects moving within the target area; and generating an image associated with the SAR data that depicts the one or more target objects and the velocities associated with one or more target objects.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
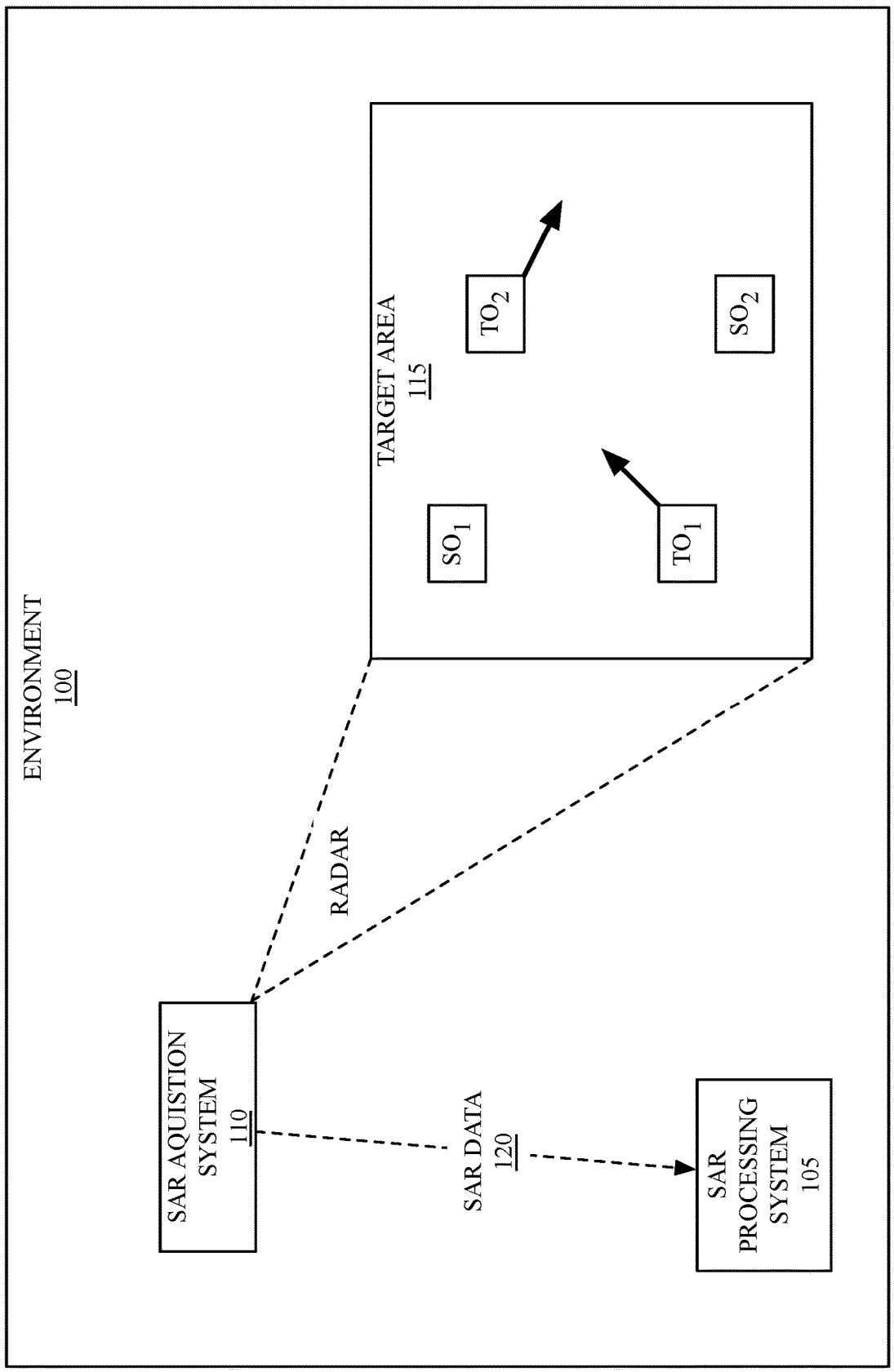
FIG. 1 illustrates an environment that includes a SAR processing system and a SAR acquisition system, in accordance with example embodiments.

Various examples of systems, devices, and/or methods are described herein. Any embodiment, implementation, and/or feature described herein as being an example is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

As noted above, synthetic aperture radar (SAR) is used extensively in satellite and airborne imaging for many different applications such as providing a 2D reflectivity map of a target area. Various polarization methods can be used to enhance both clutter and man-made object detection in the target area.

However, if moving targets are also present in a scene being imaged by SAR, they produce the additional complication of smearing under most SAR image formation algorithms. This smearing tends to combine both target and clutter and so reduces the advantages of polarimetric SAR as a target discriminator. While sub-aperture processing can try and determine moving targets, such processing reduces the resolution at the same time as reducing the smearing, leading to less than satisfactory results. When there are several moving targets in the same scene with different velocities, imaging becomes even more complicated.

These and other issues are ameliorated by the methods and systems described herein. For instance, examples of SAR processing systems described herein are configured to receive synthetic aperture radar (SAR) data that specifics a sequence of radar acquisitions of a target area taken over a particular acquisition time. The SAR processing systems form a plurality of sub-aperture images. Each sub-aperture image is associated with radar acquisitions of the target area taken over a particular interval of the acquisition time. The SAR processing systems determine, based on the plurality of sub-aperture images, velocities associated with one or more target objects moving within the target area; and generate an image associated with the SAR data that depicts the one or more target objects and the velocities associated with one or more target objects. The target objects depicted within the images are not smeared, as would be the case by images prepared by convention SAR processing systems.

FIG. 1 illustrates an example of an environment 100 that includes a SAR processing system 105 and a SAR acquisition system 110. An example of the SAR acquisition system 110 corresponds to an airborne SAR acquisition system 110 that is carried by an airplane, a satellite, etc. The SAR acquisition system 110 is configured to image a target area 115. The imaged area is communicated to a SAR processing system 105 in the form of SAR data 120. Some examples of the SAR acquisition system 110 are carried by the airborne vehicle. Some examples of the SAR acquisition system 110 are part of a ground-based monitoring station that communicates with the airborne vehicle.

Some examples of the target area 115 correspond to particular geographic land regions that are of interest. Examples of the target area 115 comprise stationary objects denoted $SO_x$ and target objects denoted $TO_x$. Vectors that extend from the target objects indicate the direction and speeds of the target objects. Examples of the stationary objects correspond to structures and/or other geographic features (e.g., rivers, mountains, etc.). that remain generally stationary. Examples of the target objects correspond to moving objects such as vehicles (e.g., ground or aerial vehicles, ships, etc.).

Figure 2:
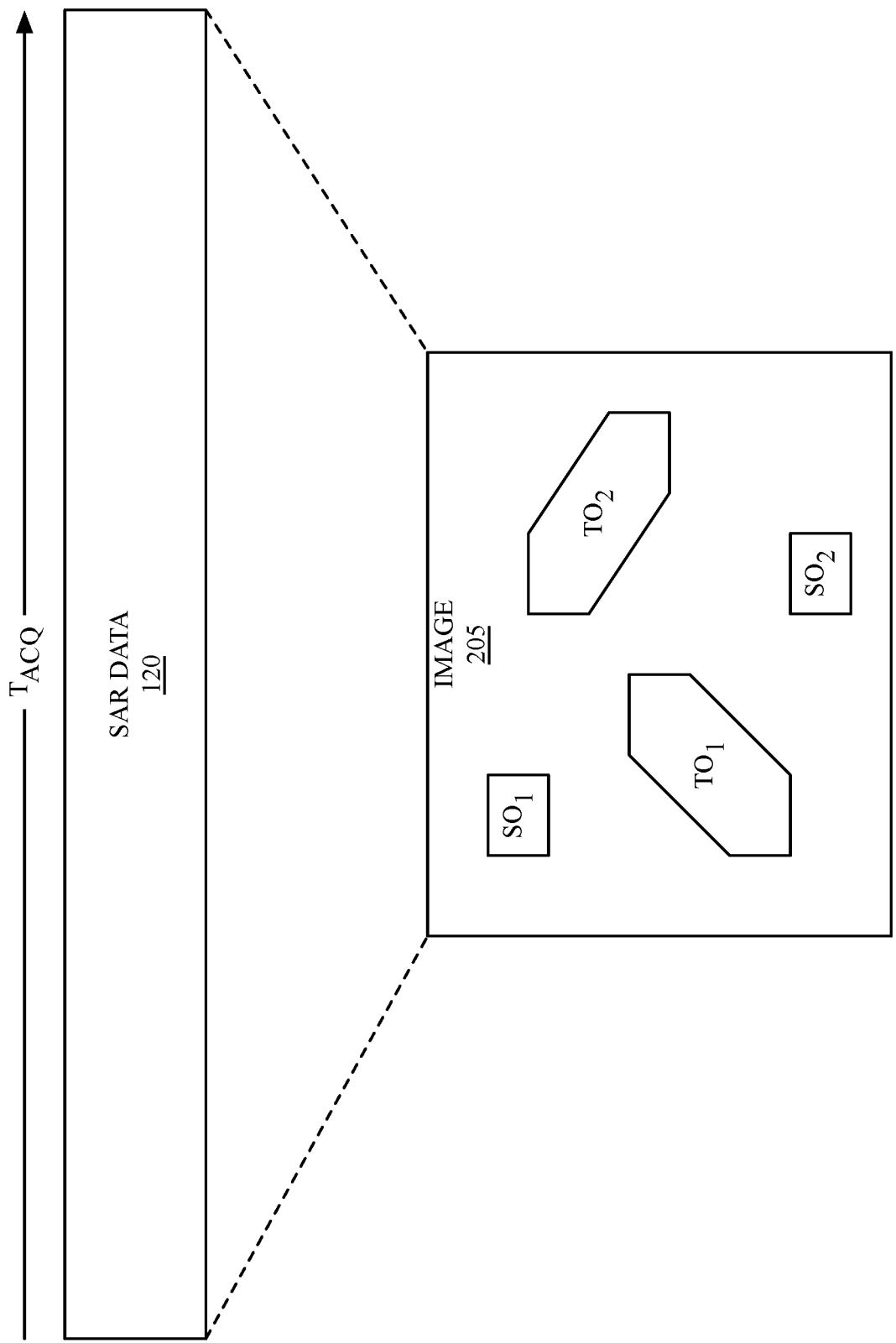
FIG. 2 illustrates an image of a target area that is produced by a conventional SAR processing system.

FIG. 2 illustrates an example of an image 205 of the target area 115 that is produced by a conventional SAR processing system. Shown are a representation of the SAR data 120 captured over a particular acquisition time $T_{ACQ}$ (e.g., 120 seconds) and an image 205 generated by a conventional SAR processing system. As shown, stationary targets $SO_1$ and $SO_2$ appear sharp in the image 205. However, target objects $TO_1$ and $TO_2$ appear smeared because these objects move by a significant amount during the acquisition time $T_{ACQ}$.

Figure 3:
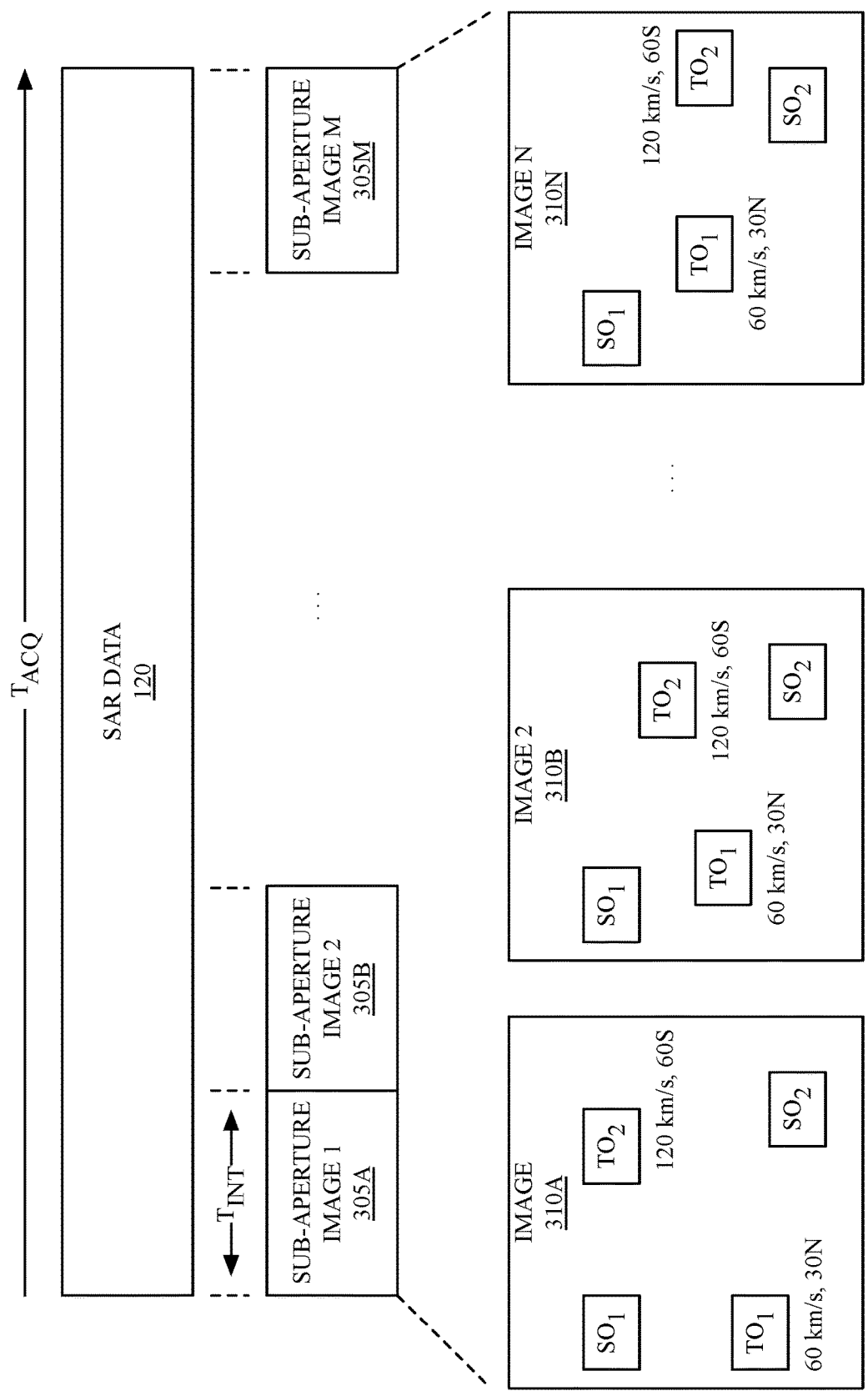
FIG. 3 illustrates an image of the target area that is produced by a SAR processing system configured to ameliorate smearing issues, in accordance with example embodiments.

FIG. 3 illustrates an example of an image 310 of the target area 115 that is produced by an example of a SAR processing system 105 configured to ameliorate the smearing issue noted above. As will be described in greater detail below, the SAR processing system 105 is configured to receive synthetic aperture radar (SAR) data that specifies a sequence of radar acquisitions of the target area 115 taken over a particular acquisition time $T_{ACQ}$. The SAR processing system 105 is then configured to form a plurality of sub-aperture images 305. Each sub-aperture image 305 is associated with radar acquisitions of the target area 115 taken over a particular interval TINT of the acquisition time $T_{ACQ}$. The SAR processing system 105 is then configured to determine, based on the plurality of sub-aperture images 305, velocities associated with one or more target objects $TO_1$, $TO_2$ moving within the target area 115. The processing system 105 generates an image associated with the SAR data that depicts the one or more target objects $TO_1$, $TO_2$ and the velocities associated with one or more target objects $TO_1$, $TO_2$ (e.g., $TO_1$ moving 60 km/s bearing 30 degrees North). The principles by which the SAR processing system 105 generates the sub-aperture images 305 and the image 310 are set forth in the following paragraphs.

SAR Imaging and the Data Matrix

The main idea behind SAR is to combine coherently the information obtained with a single transmitter and receiver that is probing the medium from multiple locations. SAR can form a synthetic aperture and achieve high-resolution images of reflectivity, even though the single receiver is incapable of resolving the scattered wavefronts. Data is collected by a moving platform, with a slow-time s dependent position r̂(s), emitting a sequence of fast-time broadband pulses f(t) and recording the echoes corresponding to each pulse. Here slow time parametrizes the location of the platform at the instant it emits each pulse and the fast time parametrizes the echoes received between two consecutive illuminations (0<t<Δs). Note: For radar there are two time dimensions: fast-time and slow-time. Fast-time corresponds to a small-scale time measurement of radar data during each pulse and is on the order of micro or nanoseconds. Slow-time is a much larger time scale, and corresponds to the pulse-to-pulse time, which is on the order of milliseconds. Thus the platform can be treated as being stationary in fast time but moving in slow time. The pulses have a pulse repetition interval (PRI) of Δs where the pulses do not overlap in time. The pulses received and recorded are denoted by D(s, t), parameterized by slow time s and fast time t. These consist of a superposition of emitted signals time delayed by the round-trip travel time between the platform location at f̂(s) and locations ρ on the ground denoted by:

$$\tau(s, p) = 2\frac{\|\hat{r}(s) - \rho\|}{c}$$

where c is the speed of light.

The transmitted pulses f(t) are typically linear frequency modulated chirps with duration $t_c \gg 1/B$ where B denotes the bandwidth of the pulse. This technique is called pulse compression, which allows more power to be placed on the scatterers on the ground through re-concentration (or decompression). This is done by convolving with the complex conjugate of the time-reversed emitted pulse. This is the pulse compression step, denoted by $$D_p(s,t) = \int D(s,t') \overline{f(-t')} dt'$$

Since the reflections relevant for imaging cover a limited area of support $\ll \Delta s$, a range compression is done as well, that is, the large phase $\omega \tau(s, \rho_0)$ of $D_p(s, \omega)$ is removed from the data where $\rho_0$ is a chosen reference point. Pulse and range compression together give the decompressed received data, $$D_r(s,t) = D_p(s, t' + \tau(s, \rho_0))$$

where t' is time shifted so that $$t' + \tau(s, \rho_0) = t \in [0, \Delta s].$$

The SAR data matrix $D \in \mathbb{R}^{n \times m}$ is actually obtained in discrete samples of $D_r(s; t)$.

$$D_{ij} D_r(s_i, t_j), i=1, \ldots, n, j=1, \ldots, m,$$

with slow times $s_i$ defined by $$s_i = (i-1)\Delta s, i=1, \ldots, n$$

And with fast times $t_j$ defined as $$t_j = (j-1)\Delta t, j=1, \ldots, m$$

Here it is assumed that the pulse repetition rate Δs is an integer multiple of Δt and set m=Δs/Δt. The SAR image is formed by summing coherently the decompressed data $D_r(s_j, t)$ back-propagated to the imaging point ρ using the travel time differences $\tau(s_j, \rho) - \tau(s_j, \rho_0)$.

$$I_{SAR}(\rho) = \sum_{j=-n/2}^{n/2} D_r(s_j, \tau(s_j, \rho) - \tau(s_j, \rho_0))$$

The full complex valued image is denoted by $I_{SAR}(D_r)$ and its absolute value or decibel version can be viewed as a grayscale image in the usual sense and used for standard image processing. The quality of images obtained by the previous approach requires precise trajectory measurements of the SAR platform and a precisely defined flat image plane. However, for SAR resolutions better than about 1 meter, this image needs to be corrected for what amounts to uncompensated phase errors in the SAR data. To correct these residual phase errors, autofocus techniques are applied, which use the back-scattered signals directly. An example of an autofocus technique is described below with reference to FIG. 4.

The SAR processing described above assumes that only reflections from stationary targets are contained in the data $D_r(s, t)$. Consequently, if moving targets are present in the region to be imaged, their reflections are not correctly back-propagated, and this results in blurred images affected by the reflectivity and the velocity of the moving targets. For a complex scene with many stationary and moving targets, the image may be severely distorted, and neither the stationary nor the moving targets may be imaged or tracked. In fact, a moving target in the SAR scene can have both range and cross-range velocity components. The range component of the velocity causes smear and defocusing simultaneously in the range and cross-range directions. Additionally, it causes a cross-range position shift. On the other hand, the cross-range component of the target velocity produces a defocusing in the cross-range direction only.

Figure 4:
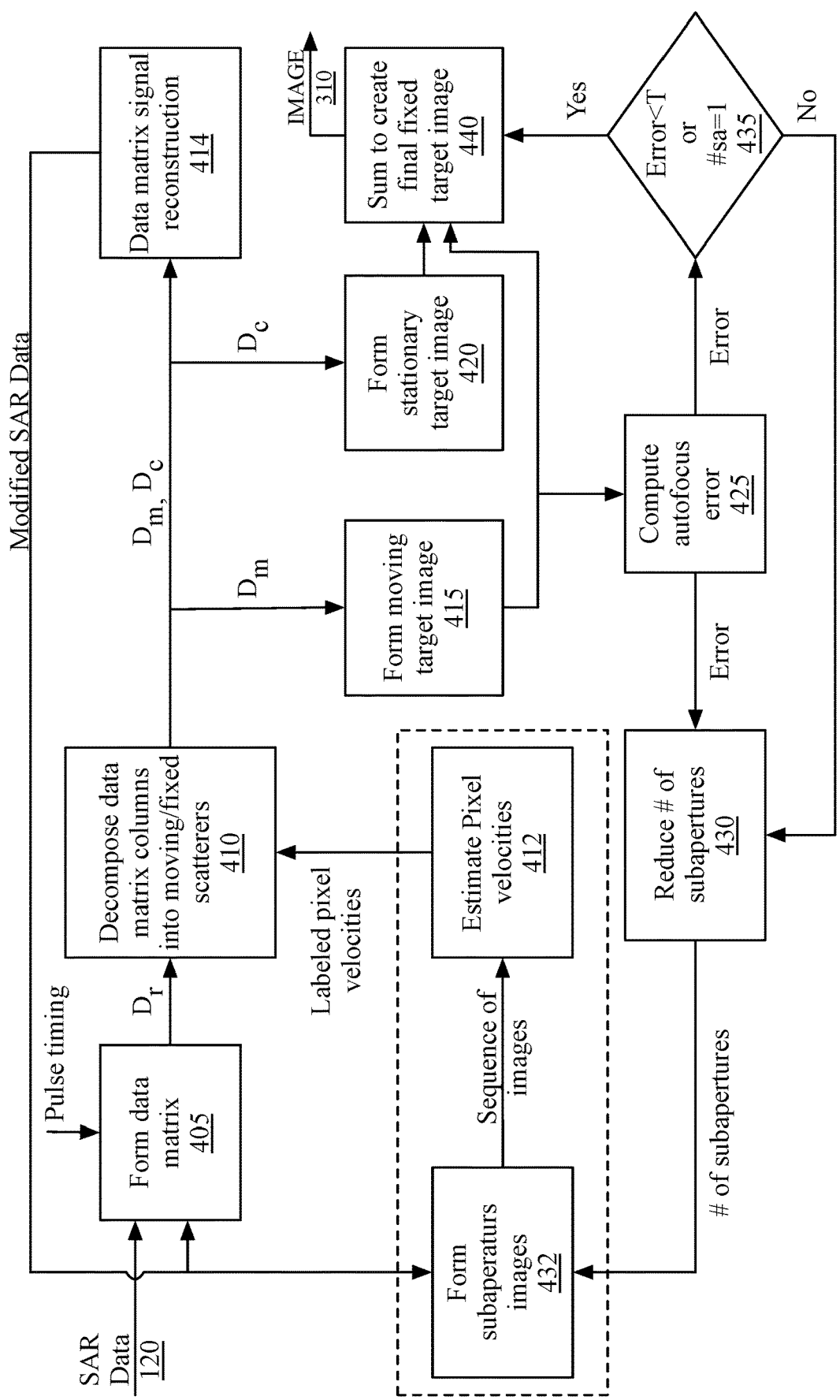
FIG. 4 illustrates a logical diagram of operations implemented by a SAR processing system to facilitate the ameliorating of the smearing issues, in accordance with example embodiments.

FIG. 4 illustrates a logical diagram of operations that ameliorate these issues. In particular, the operations involve the implementation of a velocity pixel cueing process (see operations in dotted box) and producing labeled moving pixels and their non-zero velocity. This comprises forming subapertures to form a dynamic SAR video and then using image processing methods to extract the moving pixels along with their velocity.

Subaperture processing uses the fact that azimuth information coming from the synthetic array that SAR creates can be subdivided, reducing the synthetic array size and therefore reducing the resolution. The effects on moving targets are to move from subaperture image to subaperture image, thus creating a reduced resolution movie where the motion of the targets have been reduced from the full resolution image.

Referring to FIG. 4, SAR data 120 is received at block 405 and converted into the form of a data matrix $D_r$ based on the timing of each transmitted pulse separated by Δs. Some examples of the SAR data 120 are communicated from a SAR receiver (e.g., carried by an SAR acquisition system 110) that uses a phased array antenna that forms beams. Some examples of the SAR data 120 are communicated from a SAR receiver that uses a mechanical pointing antenna. The antennas are pointed to the target area 115 to be imaged.

This data matrix $D_r$ is decomposed at block 410 into moving and fixed scatterers based on cueing from a process such as shown in the dotted box that estimates and labels moving pixel velocities at block 412 (here labeling defines which sets of pixels belong to each of L moving targets). Additional details related to this aspect are described in detail in the next section.

The decomposed matrix process creates data matrices for each of L labeled moving targets $D_1$-$D_L$ and two data matrices $D_m$ and $D_C$ containing the modified moving target returns and clutter returns, and these are used to reconstruct a modified decompressed received signal at block 414 that is fed back to the cueing process to re-estimate the pixel velocities.

Also from the decomposed matrices, both a single stopped moving target image at block 415 (where the moving targets are stationary) $I_{SAR}(D_m)$ and a single stationary clutter image $I_{SAR}(D_c)$ at block 420 are formed, and an autofocus error $E(I_{SAR}(D_m))$ is computed from the moving target image at block 425.

This autofocus error is used to adjust the number of subapertures at block 430 in the feedback loop. The allows the number of subapertures formed at block 432 to slowly decrease (and thus the subaperture images increase in resolution) until the autofocus error is below a threshold parameter T.

If, at block 435, the autofocus error is below T or the number of subapertures is one, a final image 310 computed from the sum of the stopped moving target image and stationary clutter image is output at block 440.

Note that another product can be formed from the process described in addition to the stopped moving target/clutter image. This is the focused moving target/clutter movie that is similar to an optical video with focused moving targets in stationary clutter. This can be formed by using the reported average velocities of each labeled moving target. In particular, let $v_{ij}$ be the average pixel velocity (in pixels/frame) of target i, i=1, ..., L and j=1, ..., F where j varies over the number of desired frames in the focused moving target/clutter movie. Then form the sum of offset frames plus clutter into the SAR movie $$M_{SAR} = \sum_{i=1}^{L} \{I_{SAR}(D_i) + (j-1)v_{ij} + I_{SAR}(D_c)\}, \quad j=1, \ldots, F$$

SAR Imaging and the Data Matrix

Figure 5:
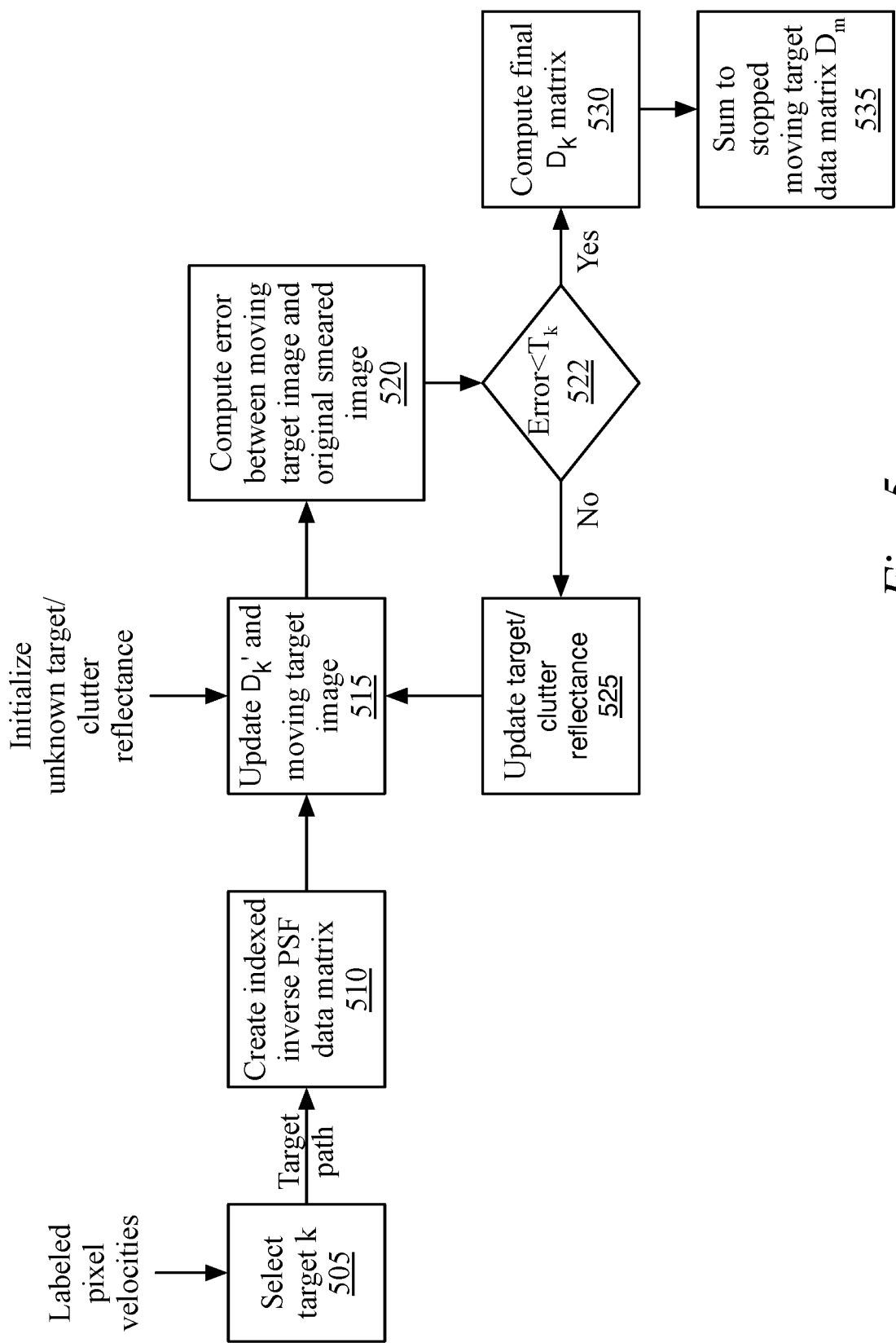
FIG. 5 illustrates a block diagram of operations that facilitate decomposing a SAR data matrix into one or more target object matrices and a background clutter matrix, in accordance with example embodiments.

FIG. 5 illustrates a block diagram of examples of operations that facilitate decomposing a SAR data matrix $D_r$ into one or more target object matrices $D_m$ and a background clutter matrix $D_c$. The data matrix decomposition takes the original data matrix formed from the received decompressed raw SAR data, called $D_d$ of size n×m where n is the number of pulses and m is the number of samples per pulse and decomposes this into L+1 data matrices $D_1, \ldots, D_L$, and $D_c$ as previously described using the labeled moving target pixel data. To simplify the process, it is assumed that:

The clutter in the scene does not obscure the moving targets. That is to say that the moving targets are always in the foreground.

The moving targets have fixed features visible in radar reflectances with enough contrast so that the autofocus error can measure how much the target (and clutter along the target path) is blurred in the full resolution image.

The point spread function characterizing the focused SAR system being used has been computed for each image location, i.e., $PSF(\rho_{ij})$ and data matrix $PSF^{-1}(\rho_{ij})$ are known for each discrete image point $\rho_{ij}$.

To simplify matters, the following discussion only considers a single moving target since multiple moving targets with independent velocities and distinct paths can be easily generalized from the following discussion.

The labeling moving target external process (shown in the dotted box in FIG. 4) is assumed to produce a collection of labeled pixel velocities for each target pixel. By this it is meant that there are collections of SAR image pixels $\{\rho_{ij}\}_l$, corresponding target pixel indices $\{a_k\}_l$ and indexed paths over slow time $\{b_{kd}\}_l$, one set for each moving target l=1, ..., L. Here the target pixel complex reflectance values are unknown, but the estimated locations are known, namely $a_k$ is a list of image pixel index pairs $\{i_k j_k\}$ of length K corresponding to $\{\rho_{i_k j_k}\}$ where the target is estimated to have started its motion at slow time 0 during the imaging process and $b_{kd}$ is a set of image pixel indices $\{\{b_{kd}\}_{d=1, \ldots, D_k}\}$, each index list of length $D_k$ indexed by slow time for each target pixel k. These path indices can, in fact, be non-integer valued if the labeling process does interpolation as a result of velocity estimates and in that case a pixel could be part clutter and part target. This is allocated via setting $r_{kd}$=rem$(b_{kd})$ and the pixel is considered to be $100 r_{kd}\%$ clutter and $100(1-r_{kd})\%$ target and use int$(b_{kd})$ as the integer pixel indices.

The data matrix decomposition involves the following processes. The index I is dropped for the targets since the processing of any one target is being described. The unknown complex reflectance values of the target are defined as $\{A_{a_k}\}$ and the unknown clutter complex reflectance values are defined as $\{B_{b_{kd}}\}$ corresponding to the pixels along the path that have been affected by the smearing of the target. A target path is selected at block 505 and the inverse PSF associated with the target path and which is performed at block 510, gives the decompressed data matrix that images to a single pixel complex value. If the data matrices are summed over all the pixels where a particular target pixel k is at any given slow time value, denoted by $$\sum_d PST^{-1}(\rho_{b_{kd}})$$

imaging this would smear the entire path of a given target pixel as it moves. However, the expression $$PSF^{-1}(\rho_{int(b_{kd})}, int(b_{kd})), d=1, \ldots, D_k$$

is defined as a data matrix where each column of index int$(b_{kd})$ is filled with the same column of $PSF^{-1}(\rho_{int(b_{kd})})$, then the sum over these data matrices would more properly represent how a moving target would have created the data matrix since the pulses would be returned in a different response over slow time as the target moves. Thus, at block 515, a data matrix is created with initial starting values $\{A_{a_k}\}$ and $\{B_{int(b_{kd})}\}$ for the first target's motion as $$D'_1 = \Sigma_k \Sigma_d ((1-r_{kd})A_{a_k} + (r_{kd})B_{int(b_{kd})}) PSF^{-1}(\rho_{int(b_{kd})}, int(b_{kd})),$$

the moving target image $I_{SAR}(D'_1)$ is formed, the norm error between this image and the original smeared image $I_{SAR}(D_r)$ is computed at block 520 on the subimage defined by the pixels $b_{kd}$, denoted by $$\|I_{SAR}(D'_1) - I_{SAR}(D_r)\|.$$

Then this error is iteratively minimized, at block 522, using any of a number of standard minimization algorithms that update the values $\{A_{a_k}\}$ and $\{B_{int(b_{kd})}\}$ at block 525 after each iteration. From this process, the final matrix is computed at block 530 and the stopped moving target data matrix is created at block 535 and from that its image and an autofocus error can be computed, as shown in FIG. 4. Note that the clutter data matrix $D_c$ is simply the original data matrix $D_r$ minus $D_m$.

Figure 6:
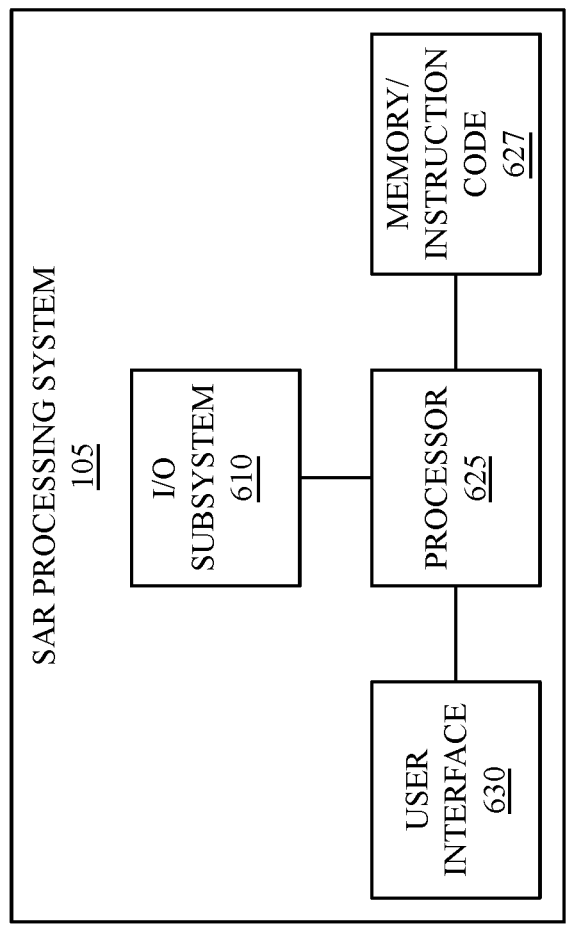
FIG. 6 illustrates a block diagram of a SAR processing system, in accordance with example embodiments

FIG. 6 illustrates a block diagram of an example of a SAR processing system 105 that implements one or more of the operations described above. The SAR processing system 105 includes a memory 627, a processor 625, a user interface 630, and an input/output (I/O) subsystem 610.

The processor 625 is in communication with the memory 627. The processor 425 is configured to execute instruction code stored in the memory 627. The instruction code facilitates performing, by the SAR processing system 105, various operations that are described below. In this regard, the instruction code may cause the processor 625 to control and coordinate various activities performed by the different subsystems of the SAR processing system 105. Some examples of the processor 625 can correspond to a stand-alone computer system such as an ARM®, Intel®, AMD®, or PowerPC® based computer system or a different computer system and can include application-specific computer systems. The computer system can include an operating system, such as Android™, Windows®, Linux®, Unix®, or a different operating system.

Some examples of the user interface 630 include display circuitry. Examples of the display circuitry include a liquid crystal display (LCD), light-emitting diode display (LED) display, etc. The display may include a transparent capacitive touchpad that facilitates receiving user commands. In this regard, some examples of the display circuitry are configured to present a graphical user interface (GUI). Some examples of the GUI facilitate depicting one or more of the images and/or videos (sequences of images) described above.

Some examples of the I/O subsystem 610 include one or more input/output interfaces configured to facilitate communications with entities outside of the SAR processing system 105. An example of the I/O subsystem 610 includes wireless communication circuitry configured to facilitate communicating information to and from the SAR processing system 105, such as, for example, receiving SAR data 120 from the SAR acquisition system 110. An example of the wireless communication circuitry includes cellular telephone communication circuitry configured to communicate information over a cellular telephone network such as a 3G, 4G, and/or 5G network. Other examples of the wireless communication circuitry facilitate communication of information via an 802.11 based network, Bluetooth®, Zigbee®, near field communication technology or a different wireless network.

Figure 7:
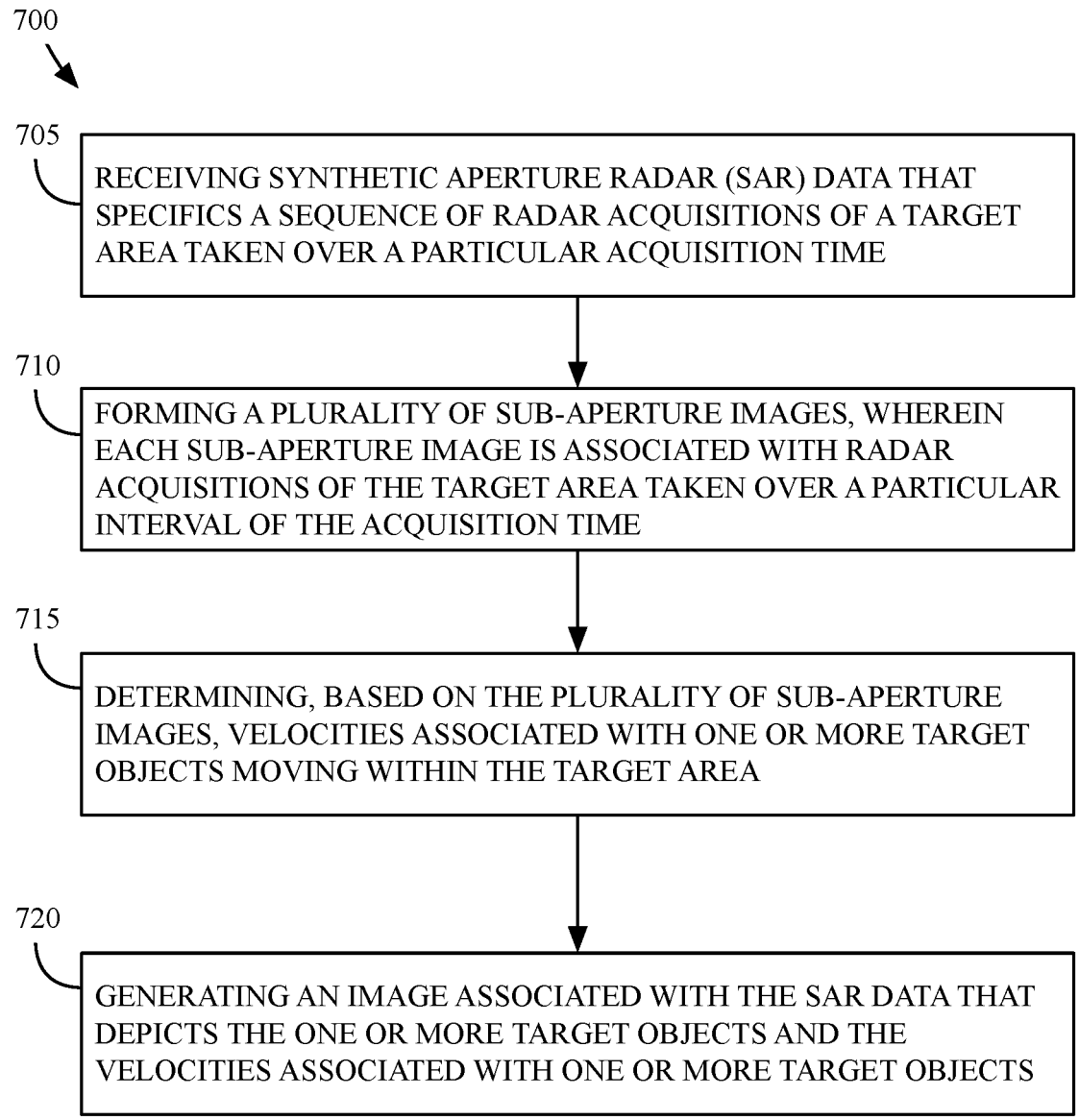
FIG. 7 illustrates operations performed by a SAR processing system, in accordance with example embodiments.

FIG. 7 illustrates an example of operations 700 performed by some examples of the SAR processing system 105. The operations at block 705 involve receiving synthetic aperture radar (SAR) data 120 that specifics a sequence of radar acquisitions of a target area 115 taken over a particular acquisition time $T_{ACQ}$.

The operations at block 710 involve forming a plurality of sub-aperture images 305, wherein each sub-aperture image 305 is associated with radar acquisitions of the target area 115 taken over a particular interval $T_{ACQ}$ of the acquisition time $T_{ACQ}$.

The operations at block 715 involve determining, based on the plurality of sub-aperture images 305, velocities associated with one or more target objects $TO_1$, $TO_2$ moving within the target area 115.

The operations at block 720 involve generating an image 310 associated with the SAR data 120 that depicts the one or more target objects $TO_1$, $TO_2$ and the velocities associated with one or more target objects $TO_1$, $TO_2$.

In some examples of the operations, determining the velocities associated with the one or more target objects $TO_1$, $TO_2$ moving within the target area 115 involves identifying, from the plurality of sub-aperture images 305, one or more pixel groups associated with the one or more target objects $TO_1$, $TO_2$, respectively, and determining the velocities of the pixel groups.

In some examples of the operations, receiving the synthetic aperture radar (SAR) data 120 involves receiving a SAR matrix $D_r$ that specifies the SAR data 120. In these examples, generating the image 310 associated with the SAR data 120 involves decomposing the SAR matrix $D_r$ into one or more target object matrices $D_m$ and a background clutter matrix $D_c$, generating one or more target images based on the one or more target object matrices $D_m$, respectively generating a background clutter image based on the background clutter matrix $D_c$, and generating the image 310 associated with the SAR data as a composite image 310 of the one or more target images and the background clutter image.

In some examples of the operations, decomposing the SAR matrix into the one or more target object matrices $D_m$ involves iteratively adjusting complex reflectance values specified in the one or more target object matrices $D_m$ that are associated with the one or more target objects $TO_1$, $TO_2$ and background clutter to minimize differences between the one or more images 310 and an image generated based on the SAR matrix.

In some examples of the operations, decomposing the SAR matrix into the background clutter matrix $D_c$ involves determining the background clutter matrix as a difference between the SAR matrix and the one or more target object matrices $D_m$.

In some examples of the operations, forming a plurality of sub-aperture images 305 involves successively increasing a size of the interval TINT over which the plurality of sub-aperture images 305 are formed, thereby decreasing a number of sub-aperture images 305, until a focus error associated with the one or more target images is at or below a threshold focus error.

In some examples of the operations, the image 310 is one of a plurality of images 310 comprised within a sequence of images, and each image of the sequence of images is associated with a different interval of the acquisition time. These examples involve generating a video 310A, 310B, . . . , 310N that comprises the sequence of images.

Figure 8:
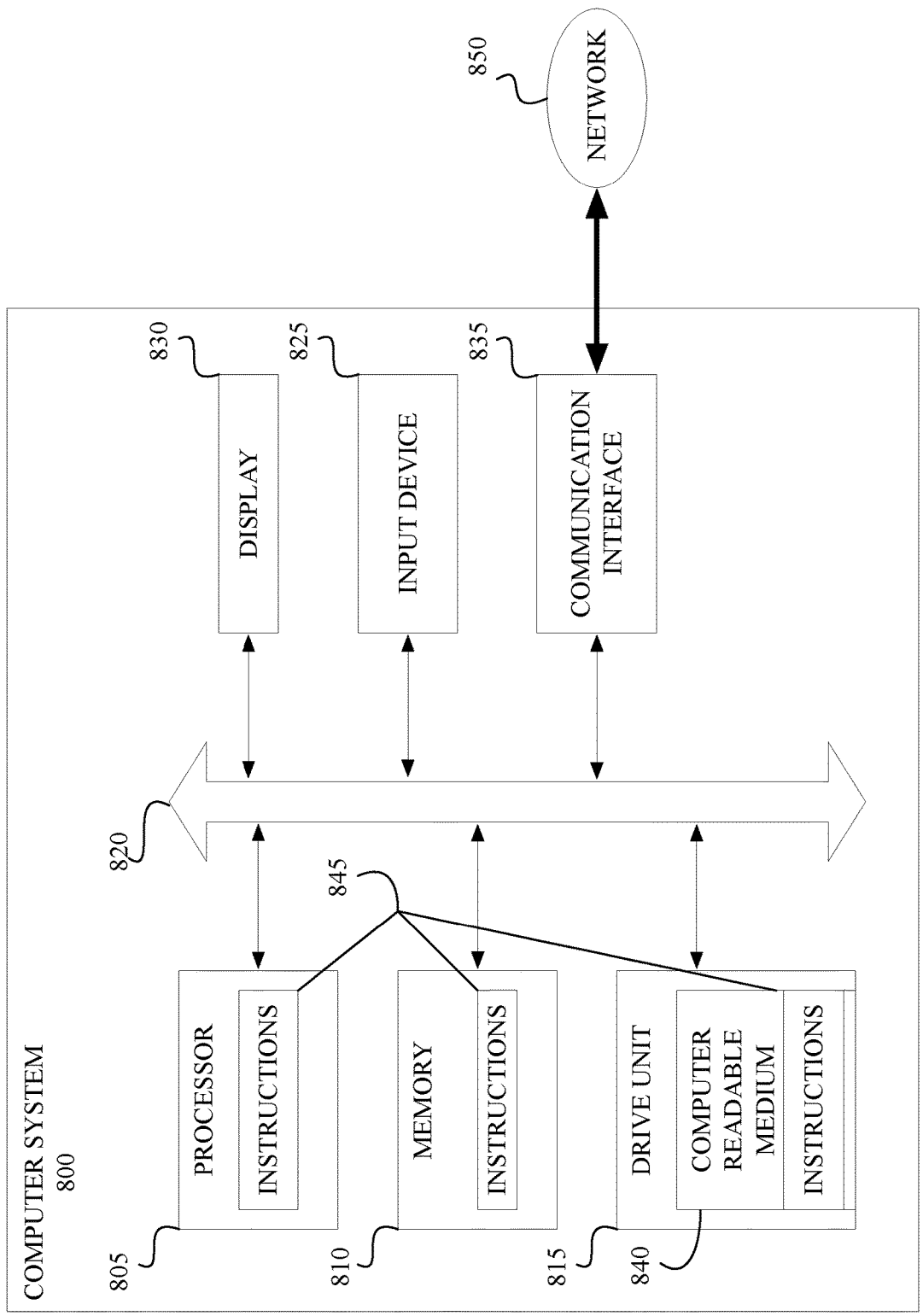
FIG. 8 illustrates a computer system, in accordance with example embodiments.

FIG. 8 illustrates an example of a computer system 800 that can form part of or implement any of the systems and/or devices described above. The computer system 800 can include a set of instructions 845 that the processor 805 can execute to cause the computer system 800 to perform any of the operations described above. An example of the computer system 800 can operate as a stand-alone device or can be connected, e.g., using a network, to other computer systems or peripheral devices.

In a networked example, the computer system 800 can operate in the capacity of a server or as a client computer in a server-client network environment, or as a peer computer system in a peer-to-peer (or distributed) environment. The computer system 800 can also be implemented as or incorporated into various devices, such as a personal computer or a mobile device, capable of executing instructions 845 (sequential or otherwise), causing a device to perform one or more actions. Further, each of the systems described can include a collection of subsystems that individually or jointly execute a set, or multiple sets, of instructions to perform one or more computer operations.

The computer system 800 can include one or more memory devices 810 communicatively coupled to a bus 820 for communicating information. In addition, code operable to cause the computer system to perform operations described above can be stored in the memory 810. The memory 810 can be random-access memory, read-only memory, programmable memory, hard disk drive, or any other type of memory or storage device.

The computer system 800 can include a display 830, such as a liquid crystal display (LCD), organic light-emitting diode (OLED) display, or any other display suitable for conveying information. The display 830 can act as an interface for the user to see processing results produced by processor 805.

Additionally, the computer system 800 can include an input device 825, such as a keyboard or mouse or touchscreen, configured to allow a user to interact with components of system 800.

The computer system 800 can also include drive unit 815 (e.g., flash storage). The drive unit 815 can include a computer-readable medium 840 in which the instructions 845 can be stored. The instructions 845 can reside completely, or at least partially, within the memory 810 and/or within the processor 805 during execution by the computer system 800. The memory 810 and the processor 805 also can include computer-readable media, as discussed above.

The computer system 800 can include a communication interface 835 to support communications via a network 850. The network 850 can include wired networks, wireless networks, or combinations thereof. The communication interface 835 can enable communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A computer-implemented method for processing radar information, the method comprising:
receiving synthetic aperture radar (SAR) data that specifics a sequence of radar acquisitions of a target area taken over a particular acquisition time, wherein the SAR data comprises a SAR matrix that specifies the SAR data;
forming a plurality of sub-aperture images, wherein each sub-aperture image is associated with radar acquisitions of the target area taken over a particular interval of the acquisition time;
determining, based on the plurality of sub-aperture images, velocities associated with one or more target objects moving within the target area; and
generating an image associated with the SAR data that depicts the one or more target objects and the velocities associated with one or more target objects, wherein generating the image associated with the SAR data comprises:
decomposing the SAR matrix into one or more target object matrices and a background clutter matrix;
generating one or more target images based on the one or more target object matrices, respectively;
generating a background clutter image based on the background clutter matrix; and
generating the image associated with the SAR as a composite image of the one or more target images and the background clutter image.

2. The computer-implemented method according to claim 1, wherein determining the velocities associated with the one or more target objects moving within the target area comprises:
identifying, from the plurality of sub-aperture images, one or more pixel groups associated with the one or more target objects, respectively; and
determining the velocities of the pixel groups.

3. The computer-implemented method according to claim 1, wherein decomposing the SAR matrix into the one or more target object matrices comprises:
iteratively adjusting complex reflectance values specified in the one or more target object matrices that are associated with the one or more target objects and background clutter to minimize differences between the one or more images and an image generated based on the SAR matrix.

4. The computer-implemented method according to claim 1, wherein decomposing the SAR matrix into the background clutter matrix comprises:
determining the background clutter matrix as a difference between the SAR matrix and the one or more target object matrices.

5. The computer-implemented method according to claim 1, wherein forming a plurality of sub-aperture images comprises:
successively increasing a size of the interval over which the plurality of sub-aperture images are formed, thereby decreasing a number of sub-aperture images, until a focus error associated with the one or more target images is at or below a threshold focus error.

6. The computer-implemented method according to claim 1, wherein the image is one of a plurality of images comprised within a sequence of images, wherein each image of the sequence of images is associated with a different interval of the acquisition time, wherein the method further comprises:
generating a video that comprises the sequence of images.

7. The computer-implemented method according to claim 2, further comprising:
labeling pixels from the plurality of sub-aperture images as belonging to the one or more target objects moving within the target area, respectively.

8. A computing device that facilitates processing radar information, the computing device comprises:

one or more processors; and a memory in communication with the one or more processors, wherein the memory stores instruction code that, when executed by the one or more processors, causes the computing device to perform operations comprising:

receiving synthetic aperture radar (SAR) data that specifics a sequence of radar acquisitions of a target area taken over a particular acquisition time, wherein the SAR data comprises a SAR matrix that specifies the SAR data;

forming a plurality of sub-aperture images, wherein each sub-aperture image is associated with radar acquisitions of the target area taken over a particular interval of the acquisition time;

determining, based on the plurality of sub-aperture images, velocities associated with one or more target objects moving within the target area; and generating an image associated with the SAR data that depicts the one or more target objects and the velocities associated with one or more target objects, wherein the operations that involve generating the image associated with the SAR data comprise:

decomposing the SAR matrix into one or more target object matrices and a background clutter matrix;

generating one or more target images based on the one or more target object matrices, respectively;

generating a background clutter image based on the background clutter matrix; and generating the image associated with the SAR as a composite image of the one or more target images and the background clutter image.

9. The computing device according to claim 8, wherein the operations that involve determining the velocities associated with the one or more target objects moving within the target area comprise:

identifying, from the plurality of sub-aperture images, one or more pixel groups associated with the one or more target objects, respectively; and determining the velocities of the pixel groups.

10. The computing device according to claim 8, wherein the operations that involve decomposing the SAR matrix into the one or more target object matrices comprise:

iteratively adjusting complex reflectance values specified in the one or more target object matrices that are associated with the one or more target objects and background clutter to minimize differences between the one or more images and an image generated based on the SAR matrix.

11. The computing device according to claim 8, wherein the operations that involve decomposing the SAR matrix into the background clutter matrix comprise:

determining the background clutter matrix as a difference between the SAR matrix and the one or more target object matrices.

12. The computing device according to claim 8, wherein the operations that involve forming a plurality of sub-aperture images comprise:

successively increasing a size of the interval over which the plurality of sub-aperture images are formed, thereby decreasing a number of sub-aperture images, until a focus error associated with the one or more target images is at or below a threshold focus error.

13. The computing device according to claim 8, wherein the image is one of a plurality of images comprised within a sequence of images, wherein each image of the sequence of images is associated with a different interval of the acquisition time, wherein the operations further comprise:

generating a video that comprises the sequence of images.

14. A non-transitory computer-readable medium having stored thereon instruction code, wherein when executed by one or more processors of a computing device, the instruction code causes the computing device to perform operations comprising:

receiving synthetic aperture radar (SAR) data that specifics a sequence of radar acquisitions of a target area taken over a particular acquisition time, wherein the SAR data comprises a SAR matrix that specifies the SAR data;

forming a plurality of sub-aperture images, wherein each sub-aperture image is associated with radar acquisitions of the target area taken over a particular interval of the acquisition time;

determining, based on the plurality of sub-aperture images, velocities associated with one or more target objects moving within the target area; and generating an image associated with the SAR data that depicts the one or more target objects and the velocities associated with one or more target objects, wherein the operations that involve generating the image associated with the SAR data comprise:

decomposing the SAR matrix into one or more target object matrices and a background clutter matrix;

generating one or more target images based on the one or more target object matrices, respectively;

generating a background clutter image based on the background clutter matrix; and generating the image associated with the SAR as a composite image of the one or more target images and the background clutter image.

15. The non-transitory computer-readable medium according to claim 14, wherein the operations that involve determining the velocities associated with the one or more target objects moving within the target area comprise:

identifying, from the plurality of sub-aperture images, one or more pixel groups associated with the one or more target objects, respectively; and determining the velocities of the pixel groups.

16. The non-transitory computer-readable medium according to claim 14, wherein the operations that involve decomposing the SAR matrix into the one or more target object matrices comprise:

iteratively adjusting complex reflectance values specified in the one or more target object matrices that are associated with the one or more target objects and background clutter to minimize differences between the one or more images and an image generated based on the SAR matrix.

17. The non-transitory computer-readable medium according to claim 14, wherein the operations that involve decomposing the SAR matrix into the background clutter matrix comprise:

determining the background clutter matrix as a difference between the SAR matrix and the one or more target object matrices.

18. The non-transitory computer-readable medium according to claim 14, wherein the operations that involve forming a plurality of sub-aperture images comprise:

successively increasing a size of the interval over which the plurality of sub-aperture images are formed, thereby decreasing a number of sub-aperture images, until a focus error associated with the one or more target images is at or below a threshold focus error.

19. The non-transitory computer-readable medium according to claim 14, wherein the image is one of a plurality of images comprised within a sequence of images, wherein each image of the sequence of images is associated with a different interval of the acquisition time, wherein the operations further comprise:

generating a video that comprises the sequence of images.

20. The non-transitory computer-readable medium according to claim 14, wherein the operations further comprise:

labeling pixels from the plurality of sub-aperture images as belonging to the one or more target objects moving within the target area, respectively.

* * * * *